(12) United States Patent
Satpute (10) Patent No.: US 8,838,453 B2
(45) Date of Patent: Sep. 16, 2014

(54) INTERACTIVE INPUT METHOD

(75) Inventor: Pravin Satpute, Thane (IN)

(73) Assignee: Red Hat, Inc., Raleigh, NC (US)

( * ) Notice: Subject to any disclaimer, the term of this patent is extended or adjusted under 35 U.S.C. 154(b) by 459 days.

(21) Appl. No.: 12/873,079

(22) Filed: Aug. 31, 2010

(65) Prior Publication Data

US 2012/0053926 A1 Mar. 1, 2012

(51) Int. Cl.
*G10L 21/00* (2013.01)
*G06F 17/27* (2006.01)
*G06F 3/023* (2006.01)
*G06F 3/0489* (2013.01)

(52) U.S. Cl.
CPC .......... *G06F 3/0236* (2013.01); *G06F 17/3755* (2013.01); *G06F 17/2735* (2013.01); *G06F 17/276* (2013.01); *G06F 3/04895* (2013.01)
USPC ........... 704/270; 715/825; 715/811; 715/810; 715/781; 715/703; 715/256; 707/749; 707/748; 707/737; 707/736; 707/705; 704/9; 704/8; 704/4; 704/260; 704/1; 455/558; 382/230; 382/182; 345/169; 341/22

(58) Field of Classification Search
CPC ................ G06F 17/30675; G06F 17/30864; G06F 17/30722; G06F 17/2735; G06F 17/30985; G10L 13/06
USPC ......... 382/182, 230; 341/22; 704/4, 270, 9, 8, 704/260, 10, 1; 715/825, 811, 810, 781, 715/703, 256; 707/749, 748, 737, 736, 705; 455/558; 345/169
See application file for complete search history.

(56) References Cited

U.S. PATENT DOCUMENTS

| | | | | |
|---|---|---|---|---|
| 5,963,671 | A * | 10/1999 | Comerford et al. | 382/230 |
| 6,307,548 | B1 * | 10/2001 | Flinchem et al. | 715/811 |
| 6,307,549 | B1 * | 10/2001 | King et al. | 715/810 |
| 7,636,083 | B2 | 12/2009 | Aoki et al. | |
| 7,664,629 | B2 * | 2/2010 | Dymetman et al. | 704/4 |
| 7,814,107 | B1 * | 10/2010 | Thirumalai et al. | 707/749 |
| 8,145,636 | B1 * | 3/2012 | Jeh et al. | 707/736 |
| 8,438,142 | B2 * | 5/2013 | Wu et al. | 707/705 |
| 2003/0023420 | A1 * | 1/2003 | Goodman | 704/1 |
| 2004/0030543 | A1 * | 2/2004 | Kida et al. | 704/8 |
| 2004/0133418 | A1 * | 7/2004 | Turcato et al. | 704/9 |
| 2004/0153975 | A1 * | 8/2004 | Williams et al. | 715/531 |
| 2005/0027513 | A1 * | 2/2005 | Kanno | 704/10 |
| 2005/0219218 | A1 * | 10/2005 | Harman | 345/169 |
| 2005/0268247 | A1 * | 12/2005 | Baneth | 715/781 |
| 2006/0079281 | A1 * | 4/2006 | Ravindra et al. | 455/558 |
| 2006/0095264 | A1 * | 5/2006 | Wu et al. | 704/260 |
| 2007/0174771 | A1 * | 7/2007 | Mistry | 715/703 |
| 2008/0291059 | A1 * | 11/2008 | Longe | 341/22 |
| 2008/0310723 | A1 * | 12/2008 | Manu et al. | 382/182 |
| 2010/0131900 | A1 * | 5/2010 | Spetalnick | 715/825 |
| 2010/0169324 | A1 * | 7/2010 | Shnitko et al. | 707/748 |
| 2011/0040759 | A1 * | 2/2011 | Rappoport et al. | 707/737 |
| 2011/0125747 | A1 * | 5/2011 | Gartung et al. | 707/737 |

* cited by examiner

*Primary Examiner* — Michael Colucci
(74) *Attorney, Agent, or Firm* — Lowenstein Sandler LLP (57) ABSTRACT

A user input is received by a computing device. An interactive input module determines whether the first user input is a first character of a script for a supported language. If the first user input is a first character, the first character is stored in an input buffer. A plurality of words in the supported language that match a contents of the input buffer are identified, and a subset of the plurality of words are displayed to the user based on a frequency value associated with each of the plurality of words.

23 Claims, 7 Drawing Sheets

INTERACTIVE INPUT METHOD

TECHNICAL FIELD

This disclosure relates to the field of data input and, in particular, to an interactive input method for data in a language with a large number of characters.

BACKGROUND

The speed of data input can directly affect the efficiency of any computing device. An alphanumeric input device, such as a keyboard, is the most common way for a user to input textual data to a computing device. One feature of a keyboard is providing the user the ability to input every character in the writing system of the language that the user is working in. The writing system, or script, is the series of characters used for the written form of a particular language. For certain languages, such as English, which make use of the Roman alphabet having 26 characters, a keyboard can generally have enough keys for a one to one mapping ratio, where each character is mapped to a separate key on the keyboard.

The size of the keyboard and the number of keys thereon have practical limitations, however. At some point, both the size of and the number of keys on a keyboard may become unwieldy. For languages written in scripts having a higher number of characters, it may be unmanageable to have a one to one mapping ratio of characters to keys on the keyboard. The Devanagari script, for example, which is used in many Indic languages such as Bodo, Dogri, Hindi, Kashmiri, Konkani, Maithili, Marathi, Nepali, and Sindhi, includes approximately 128 characters. Keyboards which support text input in the Devanagari script may typically have a character to key mapping ratio of at least three to one. With multiple characters mapped to each key, the character selection can be made through the use of modifier keys (e.g., the SHIFT key, CTRL key, etc.) This, however, requires the user to make many additional keystrokes when inputting textual data in a language making use of such a writing system. These additional keystrokes take up valuable time and decrease the user's efficiency.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for interactive input of textual data. In one embodiment, user input is received by a computing device. The user input may be received by an alphanumeric input device such as a keyboard or touchscreen. An interactive input module determines whether the user input is a character in a written script of a supported language. If the user input is a character, the character is stored in an input buffer. The interactive input module identifies a plurality of words in a dictionary providing a list of known words in a supported language that match the contents of the input buffer. The identified words may be words that begin with a first and second character stored in the input buffer. A subset of the plurality of identified words is displayed to the user based on a frequency value associated with each of the plurality of words. The subset of the plurality of words may include one or more words ordered according to the frequency value associated with each of the one or more words, where the frequency value represents a frequency with which the associated word appears in a language corpus or other sample of text. The frequency value may also represent a number of times that the user has previously selected the associated word for entry into an application program running on the computing device. The user may select one of the words in the displayed subset and the word is submitted to the application program. The interactive input module may also update the frequency value associated with the selected word in response to the selection. If the contents of the input buffer do not match any words in the dictionary, the contents of the input buffer may be added to the dictionary as a new word. The interactive input method described herein allows for efficient input of textual data to a computing device, especially where the number of characters in a writing system is greater than the number of keys on a keyboard. Examples of such a writing system include the Devanagari script used for typing languages including Bodo, Dogri, Hindi, Kashmiri, Konkani, Maithili, Marathi, Nepali, and Sindhi, and other Indic scripts, such as the Bengali script used for typing languages including Assamese and Bengali, the Oriya script used for typing the Oriya language, the Tamil script used for typing the Tamil language, the Telugu script used for typing the Telugu language, the Malayalam script sued for typing the Malayalam language, the Kannada script used for typing the Kannada language, the Gurumukhi script used for typing the Punjabi language, and the Gujarati script used for typing the Gujarati language. The interactive input method may be used, in some cases, by users of a computing system to work in their native language (e.g., Marathi, Hindi), even if living or working in a foreign country (e.g., the United States) where another language is predominantly used.

Figure 1:
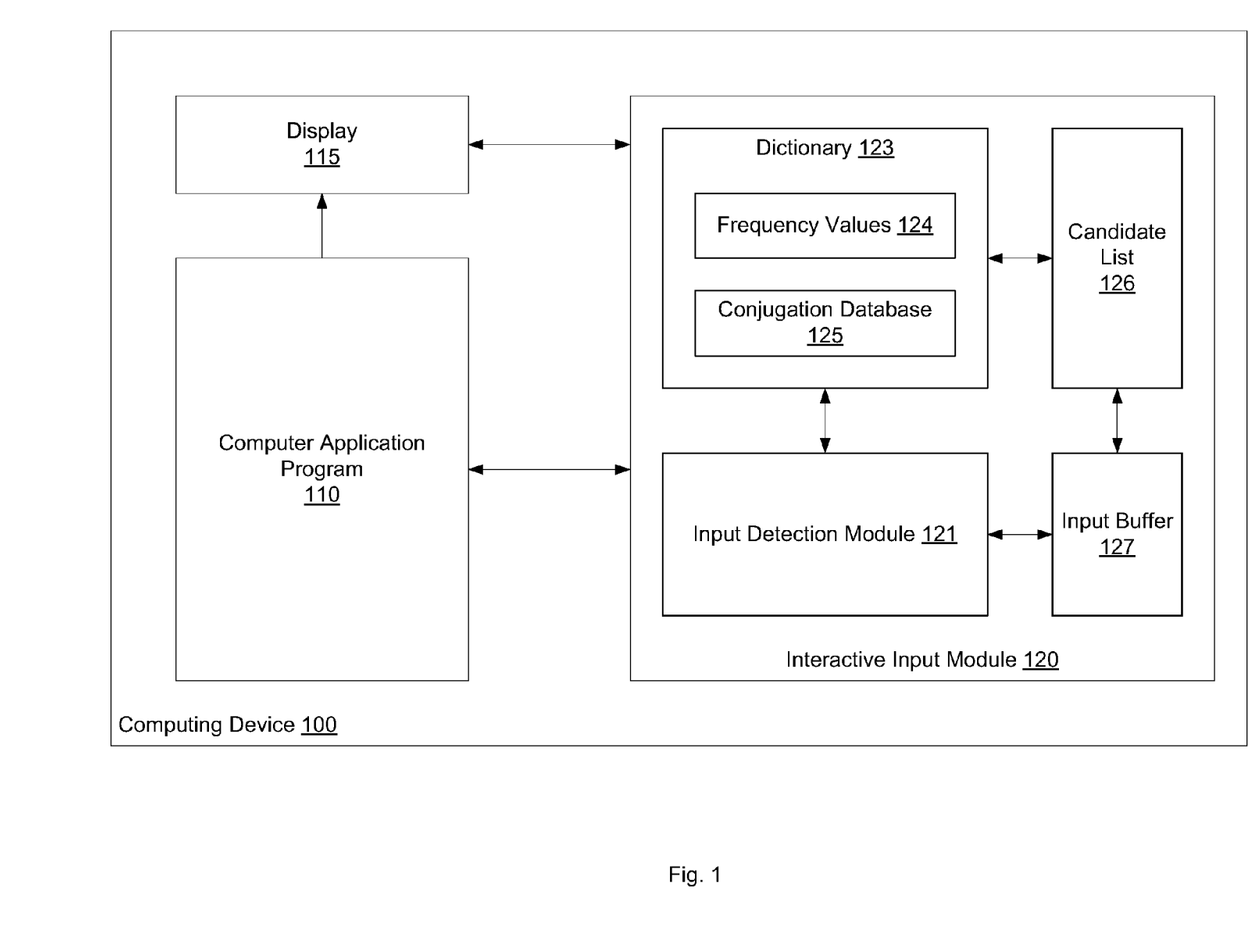
FIG. 1 is a block diagram illustrating a computing device to implement an interactive input method for textual data, according to an embodiment.

FIG. 1 is a block diagram illustrating a computing device to implement an interactive input method for textual data, according to an embodiment of the present invention. In one embodiment, computing device 100 includes a computer application program 110, into which a user inputs textual data. Computer application program 110 may implement the functionality of a word processing program, spreadsheet program, email program, chat program, web browser or other program. Embodiments of the interactive input method described herein may work with any computer application program that receives textual input from a user. The textual input may be received by computing device 100 through an alphanumeric input device, or other input device, as described below.

In one embodiment, computer application program 110 receives input from an interactive input module 120 that assists users when entering words in a writing system where the number of characters is greater than the number of keys on a keyboard. Interactive input module 120 may be part of an operating system running on computing device 100 or may be part of a separate application used by computing device 100 to provide input to various programs, such as computer application program 110. Interactive input module 120 may include input detection module 121, one or more dictionaries 123, candidate list 126 and input buffer 127. Input detection module 121 may receive a user input and determine the type of input received. In one embodiment, input detection module 121 may compare the received input to a list of known inputs to identify a match. For example, input detection module 121 may be able to identify a character in a particular language or script, a number (e.g., [0-9]), a command key (e.g., page up or page down), a space bar press, or other form of user input. The user input may include one or more characters, such as for example, two characters of a script for a supported language. Received user input is stored in input buffer 127.

Dictionary 123 may be a list of known words in a particular language. Interactive input module 120 may include a number of dictionaries for different languages and a number of application/business specific dictionaries which may be used for certain industries (i.e., banking, government, scientific, etc.). In one embodiment, dictionary 123 may be stored locally in storage of computing device 100, however in other embodiments, dictionary 123 may be remotely accessible over a network. Dictionary 123 may include a list of unconjugated base words in a particular language. Associated with each base word may be one or more frequency values 124. Frequency values 124 indicate how often the associated base word is likely to appear in a written text. In one embodiment, a first frequency value indicates how often the associated base word appears in a pre-selected written sample in the particular language. The first frequency value establishes a base line frequency before a user of computing device 100 makes use of the interactive input method. The first frequency value may be periodically updated via an update operation received over a network. A second frequency value may indicate how often the individual user of computing device 100 uses the associated word. The second frequency value may be updated each time the user includes the associated word in written text. Alternatively or in addition, the second frequency value may be continually updated over a network as all users or a select group of users include the associated word in written text on their own machines. In one embodiment, the frequency values 124 may be an actual count of the frequency of use of the associated word, however, the frequency values 124 may also be some relative value proportional to the actual use.

Dictionary 123 may additionally include a conjugation database 125. Conjugation database 125 may be similarly stored either locally or remotely and may include a list of known conjugations for each base word in dictionary 123. As will be described below, upon selection of a base word, the user may select from the list of conjugations to find the desired word.

Interactive input module 120 may perform a search of dictionary 123 based on the user input. The results of the search are stored in candidate list 126. For example, if the user inputs two characters, which are stored in input buffer 127, all base words from dictionary 123 that begin with the two characters in the input buffer 127 are stored in candidate list 126. The words may be ordered in candidate list 126 based on their frequency values 124. The words may be ordered based on the first frequency value, the second frequency value, or based on some combination of the two frequency values. A certain number (e.g., the first ten values) are presented to the user in a numbered list on display 115. Similarly, a numbered list of conjugations based on the frequency values may also be presented to the user. In response to a selection of a base word and/or conjugation, the selection is stored in the input buffer 127 and submitted to computer application program 110.

Figure 2A:
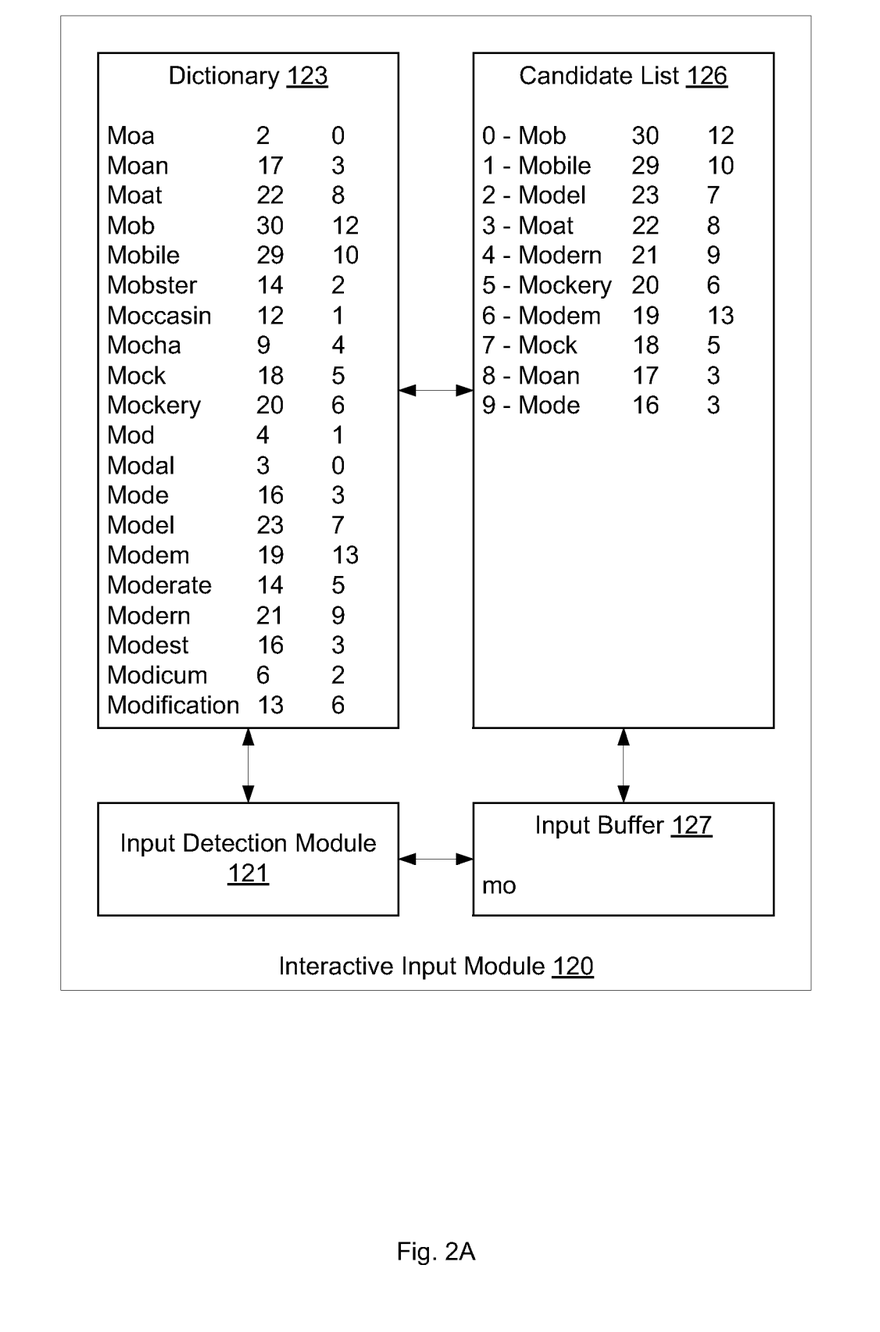
FIG. 2A is a block diagram illustrating an interactive input module, according to an embodiment.

FIG. 2A is a block diagram illustrating an interactive input module, according to an embodiment. Interactive input module 120 receives, at input detection module 121, user input, which may include one or more characters (e.g., two characters). In one embodiment, the user input is received through an alphanumeric input device, such as a keyboard or touchscreen. The input device may make use of existing keyboard layouts, so there is no need for a user to learn a new mapping scheme. Input detection module 121 recognizes the user input as characters in a script for a language supported by interactive input module 120 and stores the user input in input buffer 127. For purposes of description, the user input in this example includes the Roman alphabet characters "mo" from the English language. It should be understood that this invention may be applied any number of different languages including, for example, those using the Devanagari script, or other Indic scripts) as a writing system. A search is performed of dictionary 123 for words beginning with the characters stored in the input buffer 127. A sample of the words matching the contents of input buffer 127 is shown in dictionary 123 of FIG. 2A along with the associated frequency value for each word. Candidate list 126 is formed based on the associated frequency values to create a list of the words most likely to be selected by the user. In this embodiment, the numbered list is ordered based on the first frequency value, although in other embodiments, the list may be ordered based on the second frequency value or based on a combination of the two frequency values, such as a sum, average, or other combination. A portion of candidate list 126 is displayed to the user on a display, such as display 115 of FIG. 1. In this embodiment, 10 words are displayed from candidate list, although in other embodiments, more or fewer words may be displayed at a time. The user may make a selection from the displayed list using an input device, such as for example, a keyboard, mouse, trackball, touchscreen, or other device. If the displayed list does not show the desired word, the user may provide additional input, which may include a scrolling action (or pageup/pagedown command) to update the displayed list of words, or the input of an additional character. If an additional character is input, interactive input module 120 may perform another search of dictionary 123 to update the candidate list 126 so that the words match all of the received characters, including the additional character. If the desired word is still not displayed to the user, the user may provide input to cause the word to be submitted to computer application program 110 and added to dictionary 123 for future use.

Figure 2B:
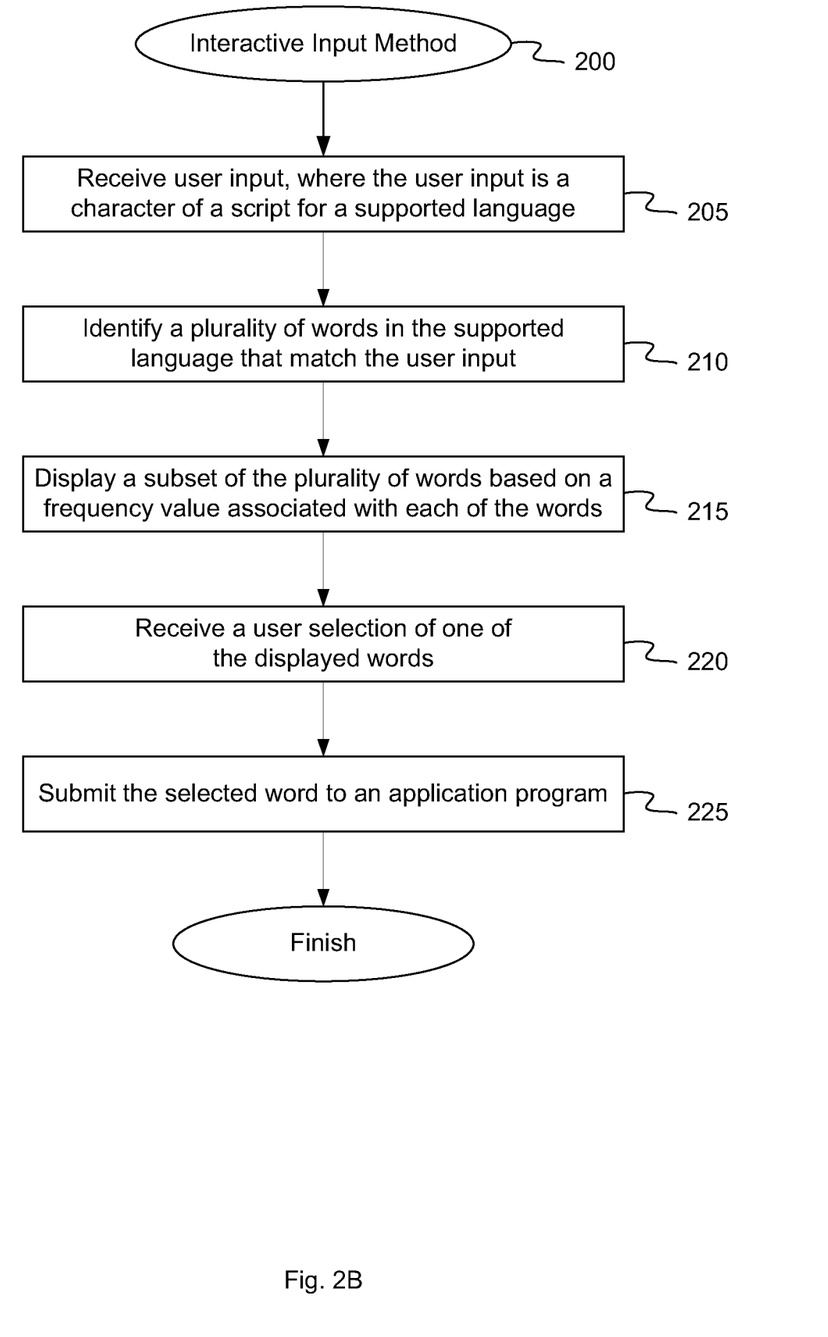
FIG. 2B is a flow diagram illustrating an interactive input method, according to an embodiment.

FIG. 2B is a flow diagram illustrating an interactive input method, according to an embodiment. The method 200 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to provide an interactive input method to efficiently receive user input in a language where the number of characters is greater than the number of keys on a keyboard. In one embodiment, method 200 may be performed by interactive input module 120, as shown in FIGS. 1 and 2A.

Referring to FIG. 2B, at block 205, method 200 receives user input. The user input may be received, for example through an alphanumeric input device, such as a keyboard or touch-screen. The user input may include one or more characters (e.g., two characters) of a script for a supported language, where the number of characters in the script is greater than the number of keys on a keyboard. At block 210, method 200 searches a dictionary for the supported language to identify words beginning with the characters received as user input. Method 200 forms a candidate list for all words in the dictionary matching the received characters. Based on the frequency value of each word in the candidate list, at block 215, method 200 displays a subset of the identified words in the candidate list. A number of words most likely to be chosen by the user are displayed in a numbered list. In one embodiment, ten words may be displayed to the user, however, in other embodiments, some other number of words may be displayed. Upon displaying the words from the candidate list, at block 220, method 200 receives a selection from the user of one of the displayed words. The selection may be received through the user input device and may include, for example, a certain key stroke (e.g., a number or a space bar press). At block 225, method 200 submits the selected word to an application program where text is being entered.

Figure 2C:
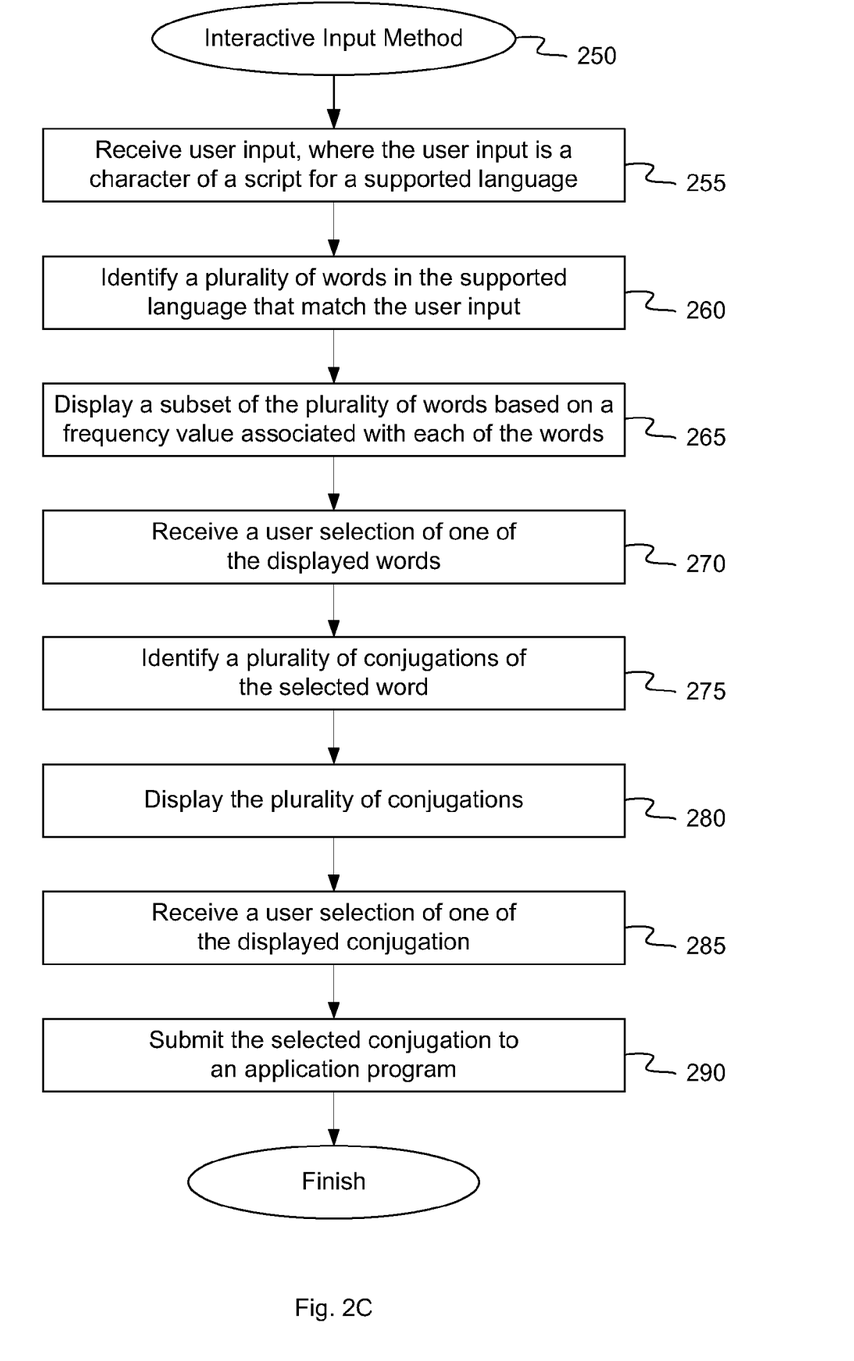
FIG. 2C is a flow diagram illustrating an interactive input method, according to an embodiment.

FIG. 2C is a flow diagram illustrating an interactive input method, according to an embodiment. In one embodiment, method 250 may be performed by interactive input module 120, as shown in FIGS. 1 and 2A. At block 255, method 250 receives user input, as described above. At block 260, method 250 searches the dictionary to identify words beginning with the characters received as user input. Method 250 forms a candidate list for all words in the dictionary matching the received characters. In one embodiment, the list of identified words may be referred to as base words. A base word is the unmodified form of a known word in the supported language. At block 265, method 250 displays a subset of the identified base words based on the frequency value of each word. At block 270, method 250 receives a selection from the user of one of the displayed base words. Upon receiving the base word selection, at block 275, method 250 searches a conjugation list, such as conjugation database 125, to identify a plurality of conjugations of the selected base word. A conjugation is a derived form of a base word that may alter the meaning of the base word by affecting person, number, gender, tense, aspect, mood, voice, or other grammatical category. The conjugation list may be a subset of the dictionary 123 for the supported language. Method 250 forms a candidate list for all conjugations in the conjugation list matching the characters in the buffer. At block 280, method 250 displays a number of conjugations in a numbered list. In one embodiment, the conjugations may have an associated frequency value, similarly to the based words in the dictionary, and the displayed list may be formed on the basis of the frequency values. At block 285, method 250 receives a selection from the user of one of the displayed conjugations, and at block 290, submits the selected conjugation to an application program where text is being entered.

Figure 3A:
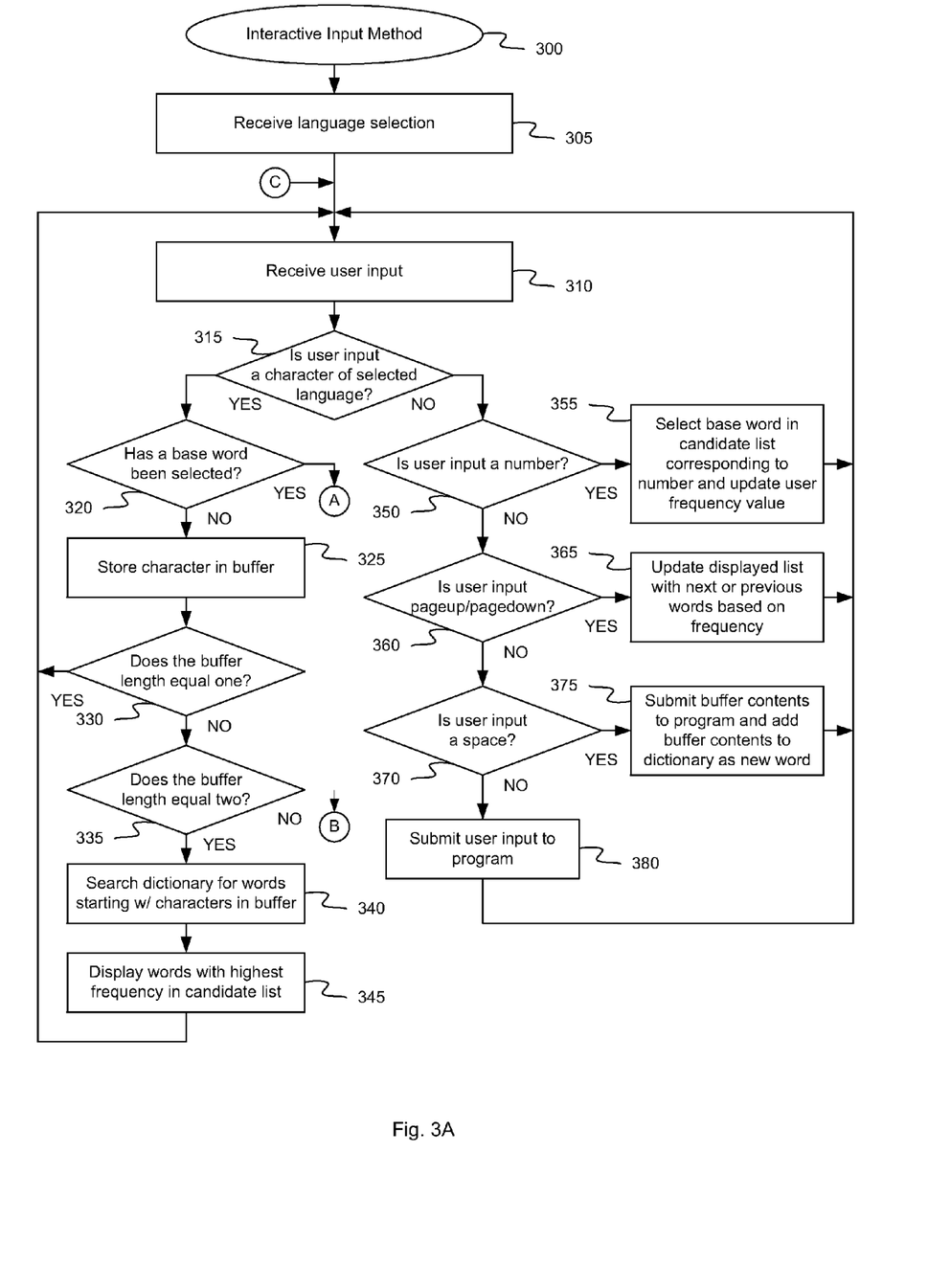
FIGS. 3A, 3B and 3C are flow diagrams illustrating an interactive input method, according to an embodiment.
Figure 3B:
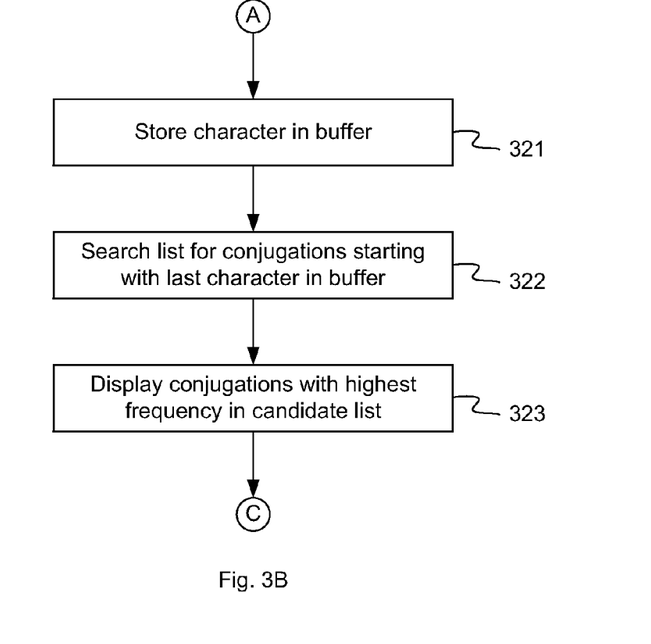
Figure 3C:
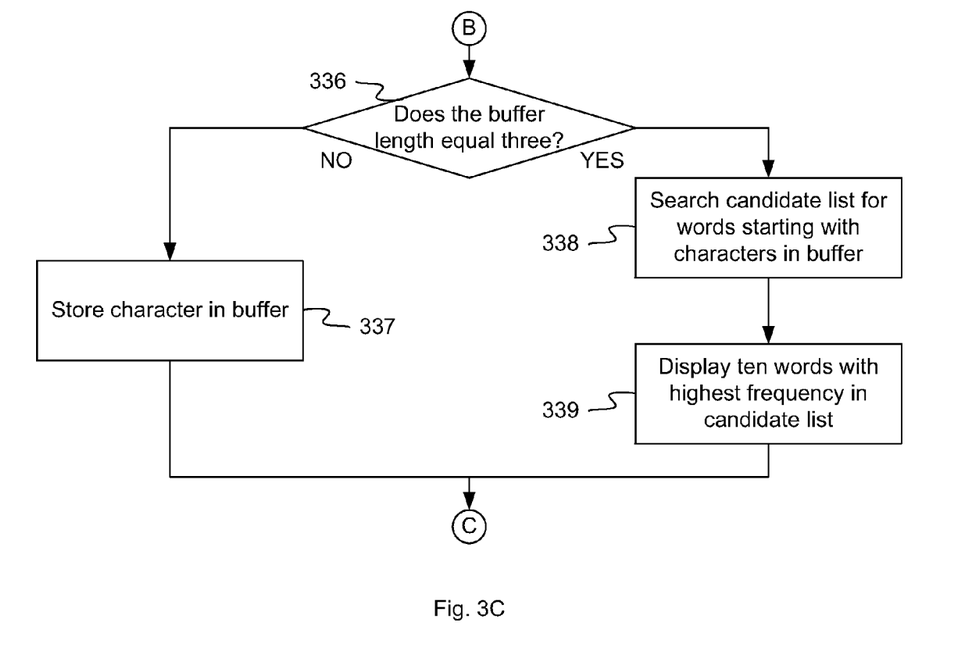

FIGS. 3A, 3B and 3C are flow diagrams illustrating an interactive input method, according to an embodiment. In one embodiment, method 300 may be performed by interactive input module 120, as shown in FIGS. 1 and 2. Referring to FIG. 3A, at block 305 method 300 receives a language selection from an end user. The user may select, using a computer input device, a language from a list of languages supported by interactive input method 300. The language selection causes a corresponding dictionary for the selected language to be used to identify user input. At block 310, method 300 receives user input. The user input may be received, for example through an alphanumeric input device, such as a keyboard or touch-screen. At block 315, method 300 determines whether the user input includes a character of the script for the language selected at block 305. Method 300 may compare the user input to a list of known characters for the selected language and if the input is a match, it is determined that the input is a character.

If at block 315, method 300 determines that the user input is a character of the selected language, at block 320, method 300 determines whether a base word has been previously selected. When a base word is selected by as user, a flag associated with the user input may be set to 1 or some other value. To determine if a base word has been selected, method 300 compares the value of the flag to the expected value representing the selection of a base word. If at block 320, method 300 determines that a base word has not been selected (i.e., the value of the flag does not match the expected value), at block 325, method 300 stores the character received as user input at block 310 in a buffer. The buffer may be part of a memory device in the computer system performing interactive input method 300.

At block 330, method 300 checks the length of the buffer (i.e., how many characters are stored in the buffer) and determines if the buffer length is equal to one. If the buffer length is equal to one, method 300 returns to block 310 to receive a next user input. If the buffer length is not equal to one, at block 335, method 300 determines if the buffer length is equal to two. If the buffer length is equal to two (i.e., there are two characters currently stored in the buffer), at block 340, method 300 searches a dictionary for the selected language for words beginning with the two characters stored in the buffer. Method 300 forms a candidate list for all words in the dictionary matching the characters in the buffer. Based on the frequency value of each word in the candidate list, at block 345, method 300 displays a number of words most likely to be chosen by the user in a numbered list. In one embodiment, ten words may be displayed to the user, however, in other embodiments, some other number of words may be displayed. Upon displaying the words from the candidate list, method 300 returns to block 310 to receive a next user input.

If at block 315, method 300 determines that the user input received at block 310 is not a character of the selected language, method 300 proceeds to block 350. At block 350, method 300 determines if the user input is a number. Method 300 may compare the user input to a list of known numbers (e.g., [0-9]) and if the input is a match, it is determined that the input is a number. If the user input is a number and the numbered list has been previously displayed to the user at block 345, at block 355, method 300 selects the base word from the candidate list corresponding to the number received as user input. The flag associated with the user input designating the selection of base word may be set to the expected value (e.g. 1) and a user frequency value of the base word in the dictionary may be incremented to reflect the current selection. Upon selection of the base word, method 300 returns to block 310 to receive a next user input.

If at block 350, method 300 determines that the user input is not a number, method 300 proceeds to block 360. At block 360, method 300 determines if the user input is a page up or page down command. The page up or page down command may be entered by pressing the respective keys on a keyboard or through a pointing device such as a mouse or touchpad. If the user input is a page up or page down command and the numbered list has been previously displayed to the user at block 345, at block 365, method 300 updates the displayed numbered list of words to show a previous or subsequent number of words from the candidate list based on the frequency values. For example, if the received user input is a page down command, and the values 0-9 were previously shown to the user, the list is updated to display values 10-19 to the user. Values 10-19 may be numbered as 10-19 or alternatively may be numbered as 0-9. Upon updating the displayed list, method 300 returns to block 310 to receive a next user input.

If at block 360, method 300 determines that the user input is not a page up or page down command, method 300 proceeds to block 370. At block 370, method 300 determines if the user input is a space bar press. If the user input is a space bar press and the length of the buffer does not equal zero, at block 375, method 300 submits the buffer contents to the application program where text is being entered. If the contents of the buffer do not match an entry in the dictionary, the contents of the buffer are added to the dictionary as a new word and the contents of the buffer are cleared. Upon submitting the buffer contents to the program, method 300 returns to block 310 to receive a next user input.

If at block 370, method 300 determines that the user input is not a space bar press (i.e., the user input is some other key press), method 300 proceeds to block 380. At block 380, method 300 submits the user input, as well as any buffer content, to the application program where text is being entered. Upon submitting the user input, method 300 returns to block 310 to receive a next user input. In other embodiments, additional options for other user inputs may be defined. For example, if the input buffer length is not equal to zero and the user input is a backspace key, the last character in the input buffer may be removed. In another example, if the user input is the escape key, the entire contents of the buffer may be removed.

If at block 320, method 300 determines that a base word has been previously submitted, method 300 proceeds to block 321. Referring to FIG. 3B, at block 321, method 300 stores the character received at block 310 in the buffer. At block 322, method 300 searches a conjugation list, such as conjugation database 125, for conjugations starting with the character most recently added to the buffer (i.e., the last character in the buffer). The conjugation list may be a subset of the dictionary 123 for the selected language. Method 300 forms a candidate list for all conjugations in the conjugation list matching the characters in the buffer. At block 323, method 300 displays a number of conjugations in a numbered list. In one embodiment, the conjugations may have an associated frequency value, similarly to the based words in the dictionary, and the displayed list may be formed on the basis of the frequency values. Upon displaying the numbered list of conjugations, method 300 returns to block 310 to receive a next user input.

If at block 335, method 300 determines that the buffer length does not equal two, method 300 proceeds to block 336. Referring to FIG. 3C, at block 336, method 300 determines if the buffer length equals three. If the buffer length does not equal three, at block 337, method 300 stores the character in the buffer, enables a flag indicating a new word (since the user has now entered a fourth character and has not selected one of the available words) and returns to block 310 to receive a next user input. The flag indicating the new word may be checked at block 375 to determine if the contents of the input buffer include a new word to be added to the dictionary. If the buffer length does equal three, at block 338, method 300 searches the candidate list formed at block 340 for words beginning with the three characters stored in the buffer. Based on the frequency value of each word in the candidate list, at block 339, method 300 displays a number of words most likely to be chosen by the user in a numbered list. Upon displaying the words from the candidate list, method 300 returns to block 310 to receive a next user input.

Figure 4:
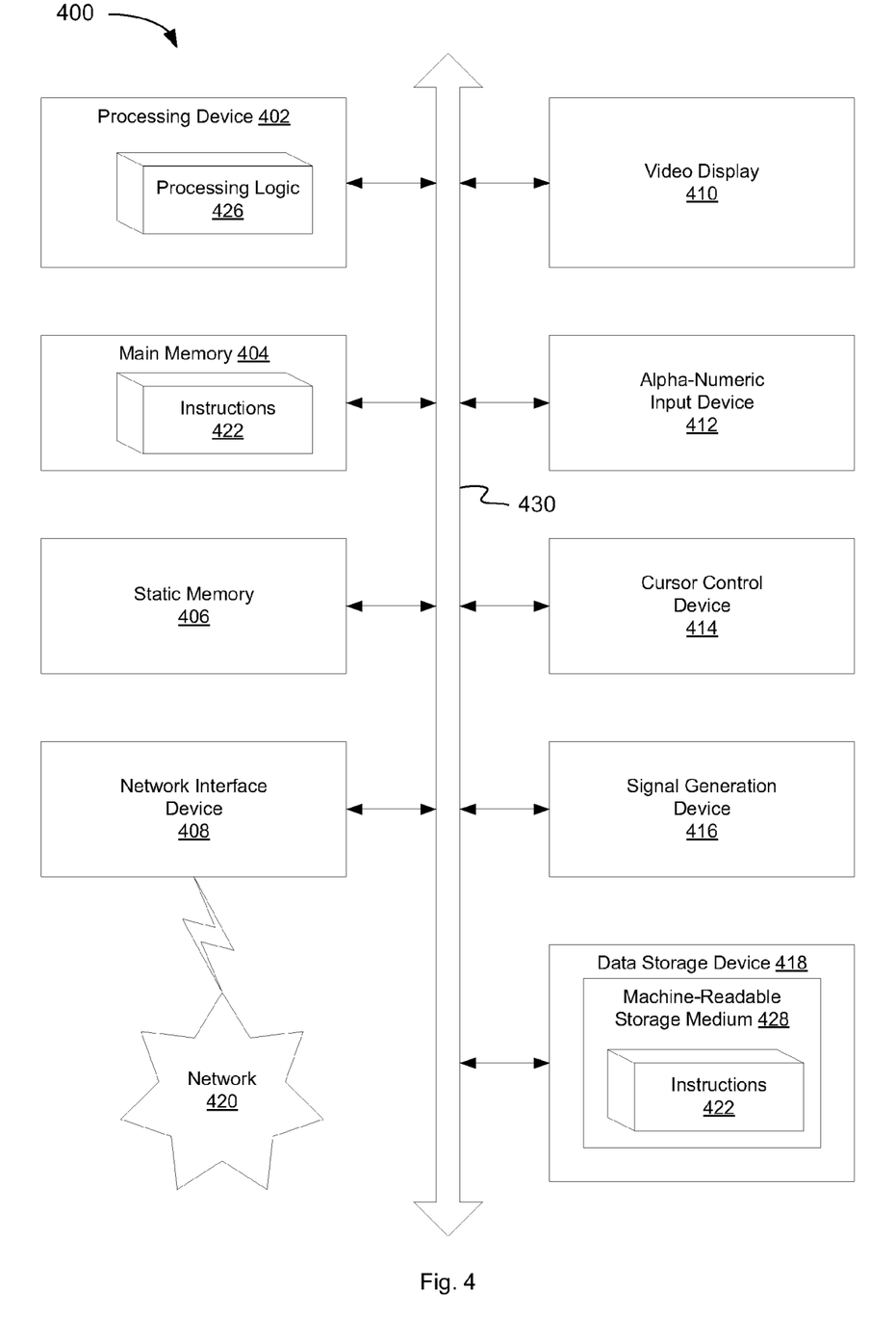
FIG. 4 is a block diagram illustrating one embodiment of a computer system, according to an embodiment.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428, on which is stored one or more set of instructions 422 (e.g., software) embodying any one or more of the methodologies of functions described herein. The instructions 422 may also reside, completely or at least partially, within the main memory 404 and/or within the processing device 402 during execution thereof by the computer system 400; the main memory 404 and the processing device 402 also constituting machine-accessible storage media. The instructions 422 may further be transmitted or received over a network 420 via the network interface device 408.

The machine-readable storage medium 428 may also be used to store instructions to perform a method 300 to efficiently receive user input in a language where the number of characters is greater than the number of keys on a keyboard, and/or a software library containing methods that call the above applications. While the machine-readable storage medium 428 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
   receiving, by a computing device, a first user input, wherein the first user input comprises at least one character of a script for a supported language where a number of characters in the script is greater than a number of keys on an input device;
   identifying a plurality of words in the supported language that match the first user input; and
   displaying a subset of the plurality of words in view of a frequency value associated with each of the plurality of words, wherein the frequency value comprises one of a sum or an average of a number of times that an associated word appears in a language corpus and a number of times that the associated word has been previously selected.

2. The method of claim 1, further comprising:
   storing the at least one character in an input buffer;
   receiving, by the computing device, a second user input;
   determining whether the second user input comprises an additional character of the script for the supported language;
   in response to the second user input comprising an additional character, storing the additional character in the input buffer, wherein identifying a plurality of words comprises identifying words in a dictionary that begin with the characters stored in the input buffer.

3. The method of claim 2, further comprising:
   receiving, by the computing device, a third user input, wherein the third user input comprises a selection of one of the words in the subset of the plurality of words.

4. The method of claim 3, further comprising:
   submitting the selected word to an application program running on the computing device; and
   updating the frequency value associated with the selected word.

5. The method of claim 3, further comprising:
   identifying a plurality of conjugations of the selected word;
   displaying the plurality of conjugations;
   receiving a user selection of one of the plurality of conjugations; and
   submitting the selected conjugation to an application program running on the computing device.

6. The method of claim 1, further comprising:
   receiving an additional user input, wherein the additional user input comprises a page up or page down command; and
   updating the displayed subset to display a previous or subsequent subset of the plurality of words in view of the frequency value associated with each of the plurality of words.

7. The method of claim 1, wherein the subset of the plurality of words comprises one or more words ordered according to the frequency value associated with each of the one or more words.

8. The method of claim 1, further comprising:
   in response to the contents of the input buffer not matching any words in the supported language, adding the contents of the input buffer to a list of words in the supported language.

9. The method of claim 1, wherein the supported language comprises any one of a language using Devanagari script, Bengali script, Gujarati script, Gurumukhi script, Kannada script, Tamil script, Telugu script, Malayalam script, or Oriya script.

10. A system, comprising:
    a processing device; and
    a memory coupled to the processing device, the memory to store:
      an application program; and
      an interactive input module executed from the processor and the memory,
    wherein the interactive input module comprises:
      an input buffer;
      a dictionary to store a list of known words in a supported language;
      a candidate list; and
      an input detection module to receive a first user input, wherein the first user input comprises at least one character of a script for the supported language where a number of characters in the script is greater than a number of keys on an input device, wherein the interactive input module to:
        identify a plurality of words in the dictionary that match the first user input and store the plurality of words in the candidate list; and
        display a subset of the plurality of words in the candidate list in view of a frequency value associated with each of the plurality of words, wherein the frequency value comprises one of a sum or an average of a number of times that an associated word appears in a language corpus and a number of times that the associated word has been previously selected.

11. The system of claim 10, wherein the input detection module is further to:
    store the at least one character in an input buffer;
    receive a second user input;
    determine whether the second user input comprises an additional character of the supported script;
    in response to the second user input comprising an additional character, store the additional character in the input buffer, wherein identifying a plurality of words comprises identifying words in the dictionary that begin with the characters stored in the input buffer.

12. The system of claim 11, wherein the input detection module is further to:
    receive a third user input, wherein the third user input comprises a selection of one of the displayed words from the candidate list.

13. The system of claim 12, wherein the input detection module is further to:
    submit the selected word to the application program; and
    update the frequency value associated with the selected word.

14. The system of claim 12, wherein the input detection module is further to:
    identify a plurality of conjugations of the selected word, wherein the conjugations are stored in the dictionary;
    display the plurality of conjugations;
    receive a user selection of one of the plurality of conjugations; and
    submit the selected conjugation to the application program.

15. The system of claim 10, wherein the input detection module is further to:
    receive an additional user input, wherein the additional user input comprises a page up or page down command; and
    update the displayed subset to display a previous or subsequent subset of the plurality of words in view of the frequency value associated with each of the plurality of words.

16. The system of claim 10, wherein the subset of the plurality of words comprises one or more words ordered according to the frequency value associated with each of the one or more words.

17. A non-transitory machine readable storage medium storing instructions which when executed cause a processing device to perform operations comprising:
    receiving a first user input, wherein the first user input comprises at least one character of a script for a supported language where a number of characters in the script is greater than a number of keys on an input device;
    identifying, by the processing device, a plurality of words in the supported language that match the first user input; and
    displaying a subset of the plurality of words in view of a frequency value associated with each of the plurality of words, wherein the frequency value comprises one of a sum or an average of a number of times that an associated word appears in a language corpus and a number of times that the associated word has been previously selected.

18. The storage medium of claim 17, wherein the operations further comprise:
    storing the at least one character in an input buffer;
    receiving a second user input;
    determining whether the second user input comprises an additional character of the script for the supported language;
    in response to the second user input comprising an additional character, storing the additional character in the input buffer, wherein identifying a plurality of words comprises identifying words in a dictionary that begin with the characters stored in the input buffer.

19. The storage medium of claim 18, wherein the operations further comprise:
    receiving a third user input, wherein the third user input comprises a selection of one of the words in the subset of the plurality of words.

20. The storage medium of claim 19, wherein the operations further comprise:
    submitting the selected word to an application program running on the data processing system; and
    updating the frequency value associated with the selected word.

21. The storage medium of claim 20, wherein the operations further comprise:
    identifying a plurality of conjugations of the selected word;
    displaying the plurality of conjugations;
    receiving a user selection of one of the plurality of conjugations; and
    submitting the selected conjugation to an application program running on the data processing system.

22. The storage medium of claim 17, wherein the operations further comprise:
    receiving an additional user input, wherein the additional user input comprises a page up or page down command; and
    updating the displayed subset to display a previous or subsequent subset of the plurality of words in view of the frequency value associated with each of the plurality of words.

23. The storage medium of claim 17, wherein the subset of the plurality of words comprises one or more words ordered according to the frequency value associated with each of the one or more words.

* * * * *